United States Patent
Belew et al.

(10) Patent No.: US 6,758,499 B1
(45) Date of Patent: Jul. 6, 2004

(54) SYSTEM AND METHOD FOR REPAIRING A CONDUIT

(75) Inventors: Michael Shane Belew, Columbus, OH (US); Leon B. Dent, Brigham City, UT (US); Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/188,738

(22) Filed: Jul. 2, 2002

(51) Int. Cl.⁷ ............................................... F16L 55/18
(52) U.S. Cl. ............................ 285/15; 285/16; 425/11; 138/99
(58) Field of Search .................. 285/15, 16; 425/11; 29/402.03, 402.09, 402.13, 402.14; 138/97, 99

(56) References Cited

U.S. PATENT DOCUMENTS

| | | | | |
|---|---|---|---|---|
| 4,049,480 A | * | 9/1977 | Kutschke | 156/94 |
| 4,176,756 A | * | 12/1979 | Gellman | 215/274 |
| 4,385,644 A | * | 5/1983 | Kaempen | 138/109 |
| 4,652,023 A | * | 3/1987 | Timmons | 285/93 |
| 4,860,799 A | * | 8/1989 | Van Noten | 138/167 |
| 5,011,196 A | * | 4/1991 | Sabatier et al. | 285/367 |
| 5,104,159 A | * | 4/1992 | Sugiyama et al. | 285/373 |
| 5,269,572 A | * | 12/1993 | Mefferd | 285/330 |
| 5,368,338 A | * | 11/1994 | Greene et al. | 285/123.16 |
| 5,443,096 A | * | 8/1995 | King | 138/167 |
| 5,823,581 A | * | 10/1998 | Coppolo | 285/373 |
| 6,086,109 A | * | 7/2000 | Esser | 285/16 |
| 6,325,106 B1 | * | 12/2001 | Esser | 138/96 T |
| 6,378,549 B1 | * | 4/2002 | Zapp | 137/315.01 |

FOREIGN PATENT DOCUMENTS

GB        2 197 420 A  *  5/1988  ................. 285/15

* cited by examiner

Primary Examiner—James M. Hewitt (57) ABSTRACT

A system and method for making a repair to a damaged section of a conduit includes a pair of couplers, which securely mate, with undamaged sections of the conduit, which straddle the damaged section of the conduit; and a bridging duct, which replaces the damaged section. In one embodiment, the couplers are placed around the undamaged section of the conduit and the bridging duct is placed around the couplers.

13 Claims, 8 Drawing Sheets

SYSTEM AND METHOD FOR REPAIRING A CONDUIT

BACKGROUND OF THE INVENTION

1. Field of the Invention

This invention relates to conduits. Specifically, the present invention relates to repairing and/or reinforcing conduits.

2. Description of the Prior Art

Modern utility companies provide resources to end-users. The resources may include energy or power, communications capability or even water. The various resources are communicated from the utility company to the end-user through infrastructure. The infrastructure may include conduits to protect the power lines, the communications lines or to carry the water. The conduits or piping are typically referred to as a utility conveyance or utility conduit. Further, piping may be placed within the conduits or the duct. The piping placed within an outer duct or conduit may be referred to as an inner conduit.

During the installation of a utility conduit, a trench is prepared for housing the conduit. The conduit is then positioned in the trench. Once the conduit is in place, the utility lines such as power lines or communications lines are pulled through the conduit from one termination point to another. The conduits are then covered or buried within the trench.

The conduit may be damaged during installation or after installation. For example, the conduit may be placed in the trench prior to pulling the utility lines through the conduit. As a result, dirt and debris such as rocks may impact the conduit and cause damage to the conduit. After the utility lines have been placed in the conduit and the trench is covered, damage may still occur to the conduit from forces bearing down from above. Once again this may cause damage to the utility conduit.

Working utility inner conduits, such those used to collocate fiber optic cable strands, are housed in a variety of ducts to protect them from the harsh earth environments in which they are installed. Quite often they are housed in flexible conduit such as manufactured from PVC or Polyethylene. This affords easy installation of the inner conduit and protects it from compromising conditions stemming from unstable soil, rights of way bearing heavy traffic and areas deemed by cable engineers as stress ridden. The installation of the inner conduit is very costly, both in time and money. Consequently, it is imperative that the integrity of the conduit be maintained at all times and that damages to the flexible conduit be properly repaired.

As mentioned previously, once the conduit is placed in a trench prepared therefor, damage to a section of the conduit can occur before or after the inner conduit is laid. In either case, the damaged section of the conduit must be replaced to ensure its viability for protecting the inner conduit from the harsh environment. Should the damage precede laying of the inner conduit, replacement of the damaged section may be required to eliminate any bends or kinks which would interfere with passing the inner conduit through the utility conduit.

Figure 1:
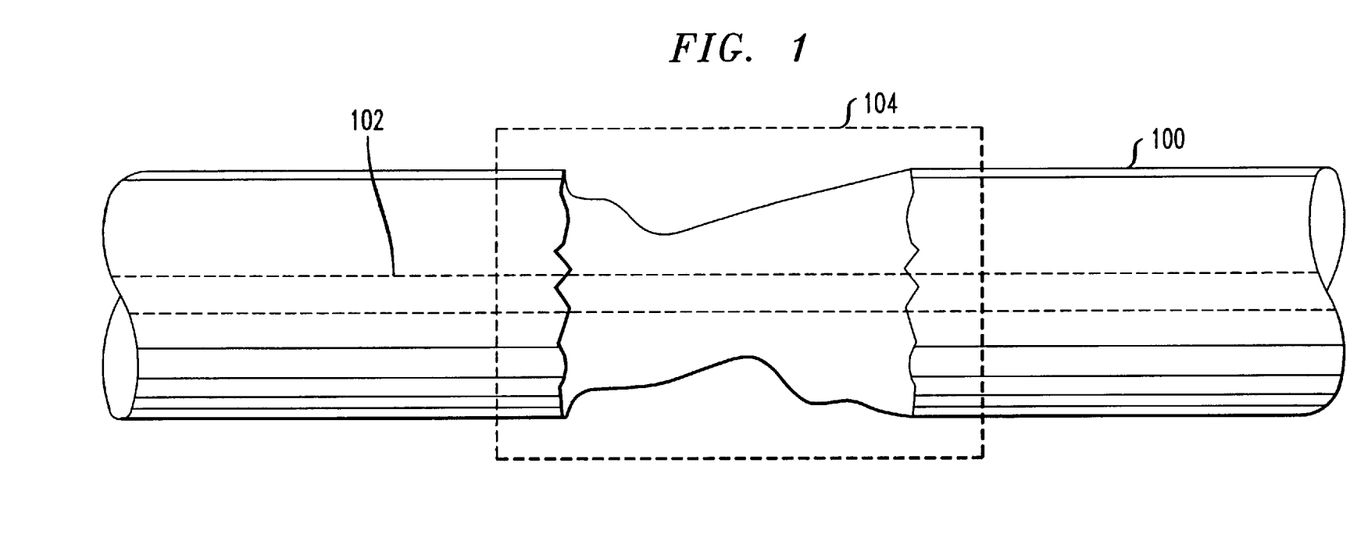
FIG. 1 displays a conduit with a damaged section.
Figure 2:
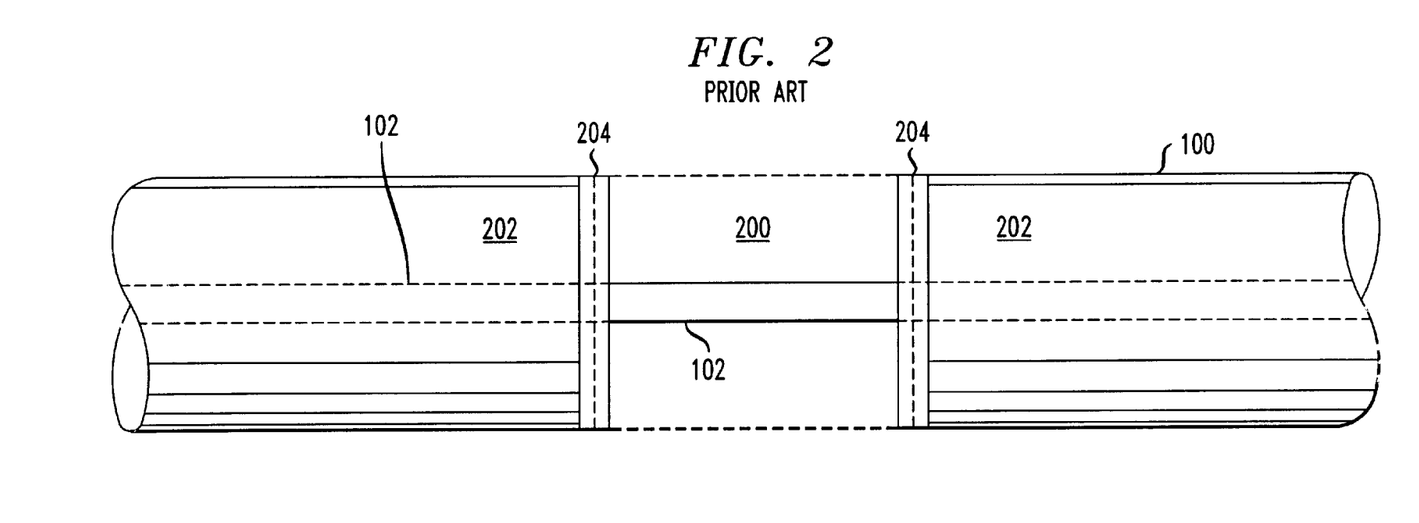
FIG. 2 displays the prior art method of repairing a conduit.

The conventional method for repairing a damaged section of a conduit is to remove the damaged section by splicing and replace it with a new piece of matching conduit. FIG. 1 and FIG. 2 display how this is done. As shown in FIG. 1, a flexible conduit 100 has a working utility inner conduit 102 consisting, for example, of fiber optic cable strands. FIG. 1 displays that conduit 100 has sustained damage in a section generally shown by reference numeral 104.

FIG. 2 displays the present method for repairing the damaged section of a conduit. In FIG. 2, damaged section 104 has been removed by splicing, leaving inner conduit 102 unaffected. A new section 200 having the same diameter and length has replaced the damaged section 104 of FIG. 1. New section 200 is inserted between the adjoining undamaged sections 202 of conduit 100 by slitting the conduit 100 lengthwise and placing the new section 200 around the exposed inner conduit 102. New section 200 is affixed to the adjoining undamaged sections 202 of flexible conduit 100 using duct tape 204 or some other fastening mechanism such as glue, etc.

The conventional method for repairing a damaged section of a flexible conduit is simple, but very unreliable. First, it does not provide any rigidity where the new section 200 is joined to the adjoining undamaged sections 202 of the conduit 100 with tape 204. Thus, the new section 200 is subject to collapse from the pressure of the dirt when ground cover is placed on top of the conduit 100. The ground cover does not only put pressure on the inner conduit 102, but it would also allow debris to find its way into the inner conduit 102, thereby jeopardizing its utility and integrity for future use.

Thus, a more effective method and apparatus for repairing and reinforcing a section of conduit is needed.

SUMMARY OF THE INVENTION

The present invention comprises a system and method for repairing a conduit by bridging two sections of the conduit with a bridging duct. A pair of couplers is employed to mate the bridging duct with the two sections of the conduit. First, the couplers are mated to their respective sections of the conduit. Thereafter, the bridging duct is mated with the couplers and fastened using a clip or sealing mechanism.

In one embodiment, the bridging duct has a slit along its length and opposing walls along the slit. The opposing walls along the slit create a reliable seal for affording rigidity and serve as a barrier to debris once the bridging duct is in place. Clips and adhesive are used to effect the seal by bringing the opposing walls together.

The bridging duct is affixed to the adjoining undamaged sections of the conduit through a pair of couplers, each having two coupling sections, the first for placing around one of the adjoining undamaged sections of the conduit and the second for allowing the bridging duct to be placed around it by opening the duct along its slit. In this embodiment, each coupler is of unitary construction with a slit along its length and a central rib separating its two coupling sections with a hinge opposite the slit, which allows the coupler to open and close along the slit.

In another embodiment, the repair system comprises a bridging duct linking the two sections of the conduit and a pair of couplers having two coupling sections, one mating with its respective section of the conduit and the other mating with the bridging duct.

In one method of the present invention, a bridging duct and a pair of couplers are used for repairing a conduit by mating each coupler with a different section of the conduit and mating the bridging duct with each coupler.

A conduit repair system is presented. A conduit includes two sections. The conduit repair system comprises a bridging duct linking the two sections of the conduit; and a pair of couplers each having an inner coupling section and an outer coupling section, the pair of couplers each mating with the bridging duct and the two sections of the conduit, the outer coupling section of each pair of the couplers mating with one of the two sections of the conduit and the inner coupling section of each pair of the couplers mating with the bridging duct.

DESCRIPTION OF THE INVENTION

Figure 3A:
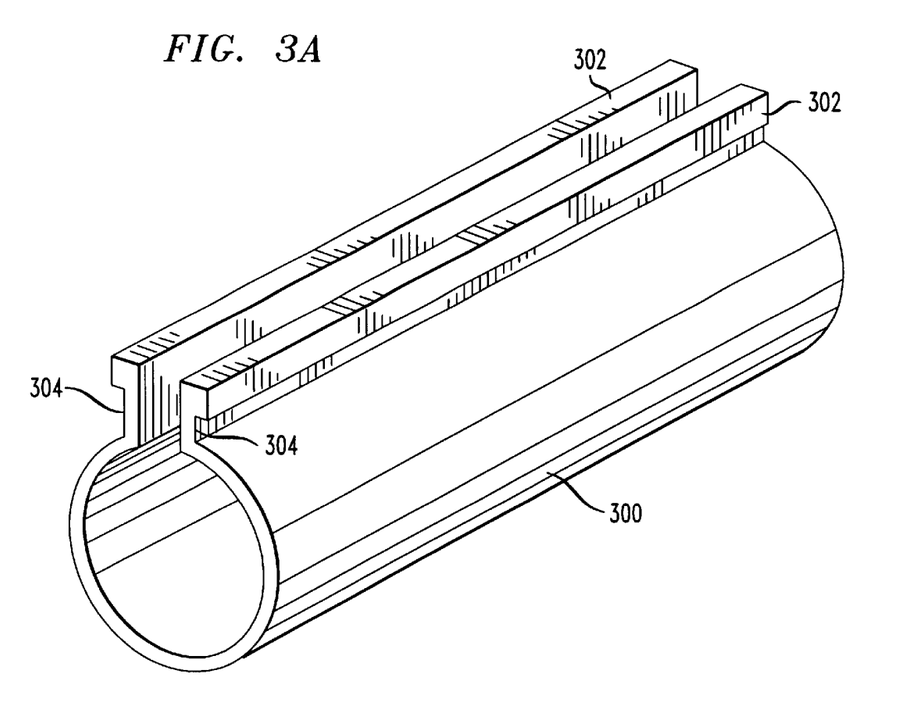
FIG. 3a displays a perspective view of the bridging duct of the present invention.
Figure 3B:
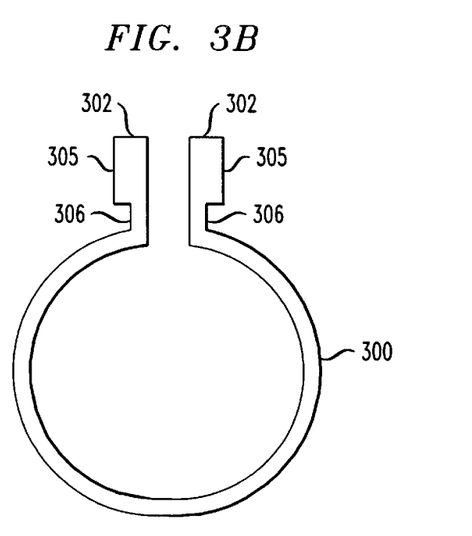
FIG. 3b displays an end view of the bridging duct.

FIG. 3a displays a perspective view of the bridging duct of the present invention. The length and cross-sectional area, normally cylindrical, would ordinarily be proportional to the damaged section of the conduit being replaced or reinforced. Bridging duct 300 includes an opening along its length (e.g. a slit). Along the slit are two opposing walls 302 which extend outward from bridging duct 300. In the outer surface of each opposing wall 302 is a slot 304. As will be seen hereinafter, slots 304 are employed for fastening the opposing walls 302 to one another after they have been pressed together to form a tight rigid seal once the bridging duct 300 is in place FIG. 3b displays an end view of the bridging duct. In FIG. 3 the opposing walls 302 are shown. In one embodiment of the present invention, the opposing walls extend directly upward from the bridging duct 300. However, the opposing walls may be angled thereby facilitating the placement of a clip for sealing the opposing walls 302. A slot 306 is shown in the opposing walls 302. The slot 306 receives the clip used to seal the opposing walls 302. Further the slot 306 creates a ridge 305. The ridge 305 guides a clip and keeps the clip in place during and after sealing of the opposing walls 302.

Figure 4A:
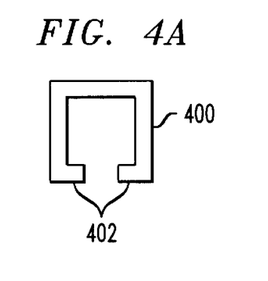
FIG. 4a displays an end view of a clip fastener for sealing the bridging duct.
Figure 4B:
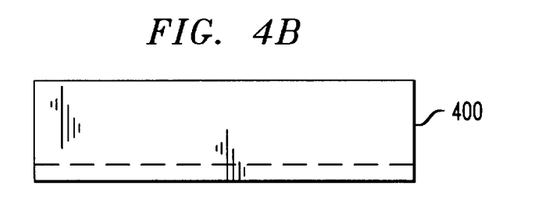
FIG. 4b displays a side view of the clip.

FIG. 4a displays an end view of a clip used in the present invention. FIG. 4b displays a side view of the clip used in the present invention. FIG. 4a display a clip 400 having legs 402. The clip 400 is used for insertion in slots 304 which run along the opposing walls 302 of bridging duct 300. The ridge 305 is used to guide the clip 400 into position. In addition, the ridge 305 serves to constrain the clip 400 so that the clip is removed by sliding the clip on and off the opposing walls 302; by positioning the clip at an end of the bridging duct 300 and sliding the clip 400 onto the opposing walls 302.

Figure 5A:
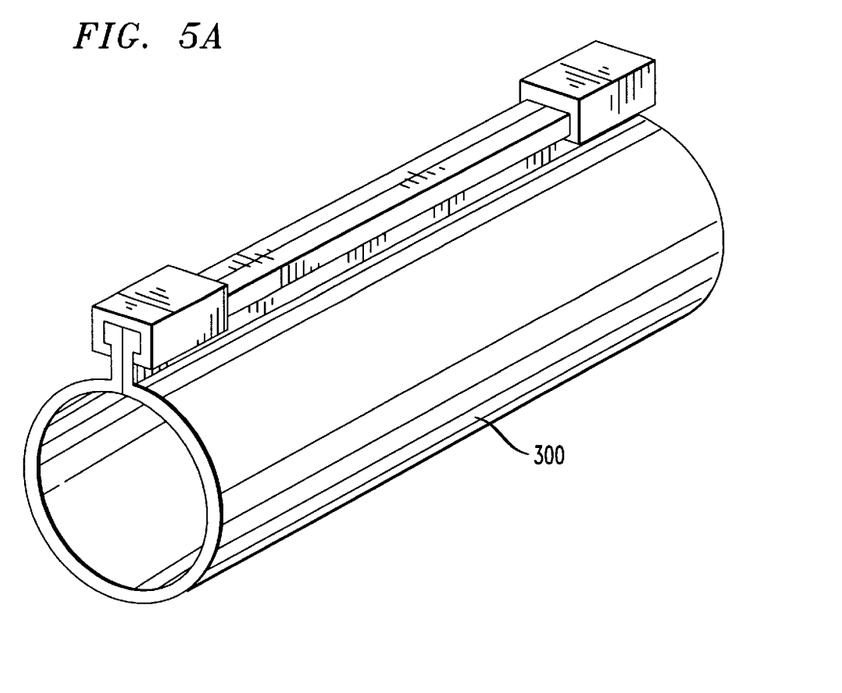
FIG. 5a displays a perspective view of the bridging duct with the clip installed.
Figure 5B:
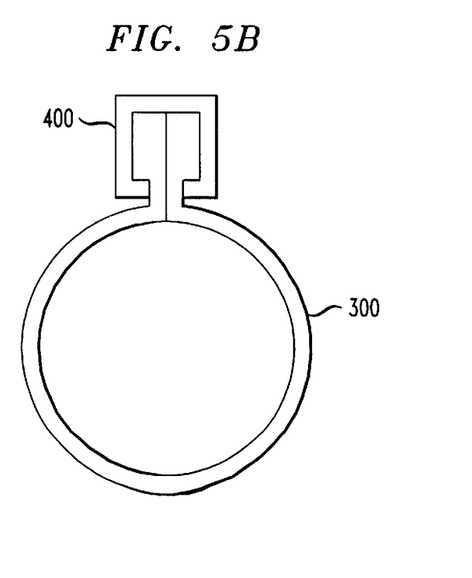
FIG. 5b displays an end view of the bridging duct with the clip installed.

FIG. 5a displays a perspective view of the bridging duct with the clip installed. FIG. 5b displays an end view of the bridging duct with the clip installed. In FIGS. 5a and 5b the clips 400 are shown installed in bridging duct 300. It should be appreciated that other types of fasteners, such as bolts, could also be used. For additional protection, a vinyl adhesive may be placed along the opposed walls 302. In addition, a removable film may be used to protect the adhesive. In FIG. 5b an end view of the bridging duct 300 is shown with the clip 400 installed.

Figure 6A:
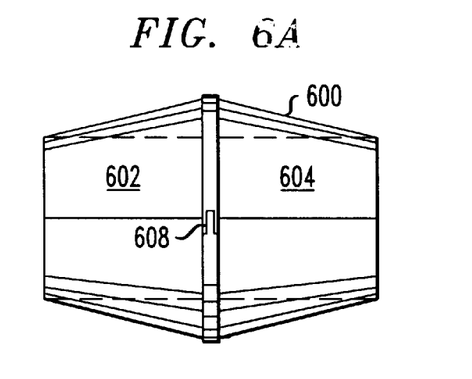
FIG. 6a displays a side view of the coupler of the invention in which a hinge can be seen for opening and closing the coupler.
Figure 6B:
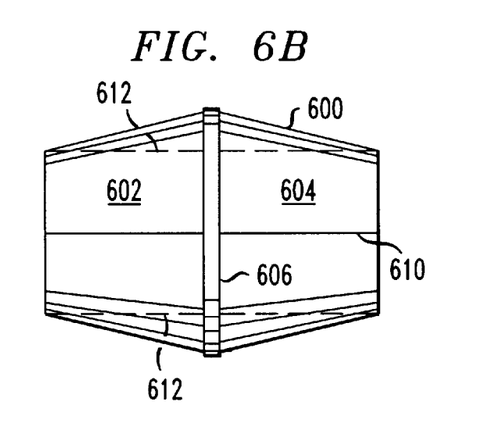
FIG. 6b displays an opposite side view of the coupler.
Figure 6C:
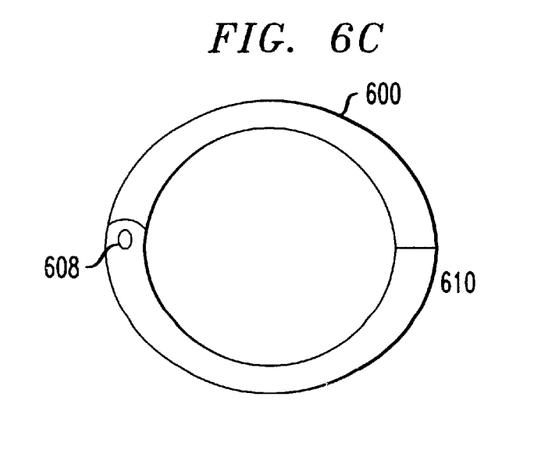
FIG. 6c displays an end view of the coupler.

FIG. 6a displays a side view of the coupler implemented in accordance with the teachings of the invention, in which a hinge can be seen for opening and closing the coupler. FIG. 6b displays an opposite side view of the coupler. FIG. 6c displays an end view of the coupler.

As shown in FIGS. 6a, 6b, and 6c, the couplers implemented in accordance with the teachings of the present invention are depicted by reference numeral 600. Each coupler has two coupling sections 602 and 604. In one embodiment of the present invention the couplers are implemented as truncated cones. These coupling sections 602 and 604 are separated by a central rib 606. For the purposes of discussion the coupling sections will be referred to as an inner coupling section 602 and an outer coupling section 604; where the inner coupling section 602 mates with the bridging duct and outer coupling section 604 mates with the conduit. As also shown in FIGS. 6a and 6c, rib 606 has a hinge 608 which allows coupler 600 to be rotationally opened and closed along a slit 610 (e.g. shown in FIG. 6c) opposite hinge 608. As will now be described, a bore through coupler 600, defined by dashed lines 612, allows coupler 600 to be mated to a section of conduit 100 (e.g. mated with the inner coupling section 602) and the bridging duct 300 (e.g. mated with the outer coupling section 604).

Figure 7:
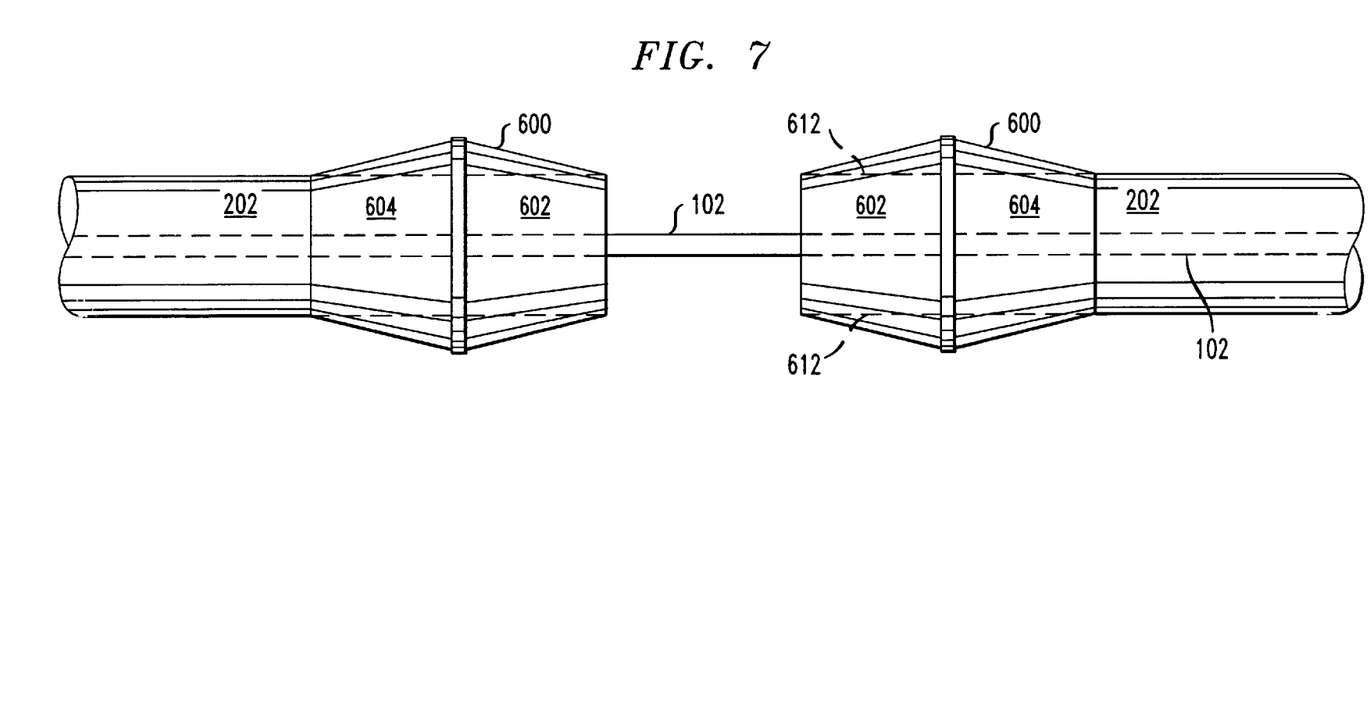
FIG. 7 displays the couplers mated with their respective sections of the conduit.

FIG. 7 displays the couplers mated with their respective sections of the conduit. FIG. 7 shows outer coupling section 604 of each coupler 600 mated to a section 202 of conduit 100 by placing it around section 202. The diameter of the bore 612 through coupler 600 is matched to the diameter of conduit 100 and presses against conduit 100 when the hinge 608 (e.g. of FIG. 6c) is used to allow coupler 600 to close along its slit 610 (e.g. of FIG. 6c). To ensure a good seal, adhesive can be applied to the periphery of conduit 100 before placing coupler 600 around it. In an alternative embodiment, couplers 600 could be inserted in sections 202 of conduit 100.

In FIG. 7 couplers 600 are shown positioned around conduits 202 and inner conduit 102. Couplers 600 include two sections, an inner coupling section 602 and an outer coupling section 604. As shown in FIG. 7, outer coupling section 604 is positioned around the ends of conduit 202. In addition, inner coupling sections 602 are positioned around inner conduit 102. Inner coupling section 602 serves as a structural member which mates with the bridging duct shown as 300. As such, both couplers 600 will reinforce inner conduit 102 and bridging duct 300.

Figure 8:
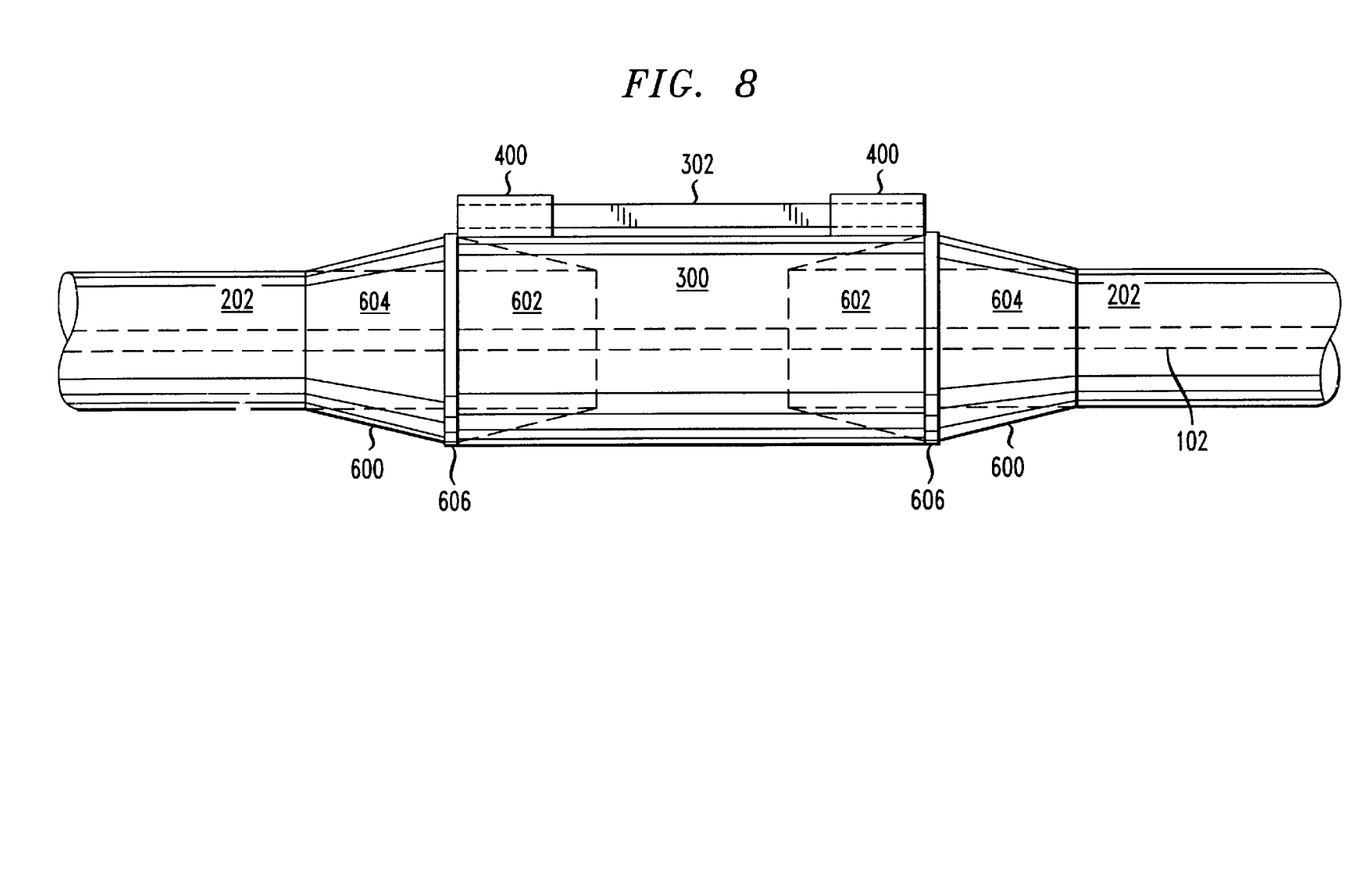
FIG. 8 displays the couplers mated with both their respective sections of the conduit and the bridging duct.

FIG. 8 displays the couplers mated with both their respective sections of the conduit and the bridging duct. As shown in FIG. 8, bridging duct 300 is placed around inner coupling sections 602 of couplers 600. The opposing walls 302 are sealed using clips 400; thereby completing the repair with a rigid, very well sealed assembly.

Although the foregoing embodiment employs a coupler 600 of unitary construction, it should be readily apparent that a coupler could be used having two split halves affixed to one another through a locking ring. In addition, the truncated coupling sections could be replaced with cylindrically shaped sections.

039 With reference to FIGS. 1–8, during operation two sections of conduit 202 are provided. The two sections of conduit 202 may be from the same conduit or from different conduit. In addition, the method and apparatus of the present invention may be applied to a damaged section of conduit where the damaged section of conduit remains in place and is not removed. As such, the damaged section of conduit would be reinforced by the method and apparatus of the present invention.

In one embodiment of the present invention a technician may remove a damaged section of conduit exposing an inner conduit 102. By removing the damaged section of conduit two sections of conduit 202 (e.g. undamaged sections) are provided for mating and the exposed inner conduit 102 extends between the two sections of conduit. In one embodiment of the present invention, the two sections of conduit 202 are prepared with an adhesive material.

Two couplers 600 are then mated to the two sections of conduit 202. The two couplers 600 include an inner coupling section 602 and an outer coupling section 604 which is separated by a rib 606 which has a hinge 608 on one side and an opening 610 on an oppositely disposed side. The two couplers 600 open and rotate around the hinge 608. When the two couplers 600 open and rotate around the hinge 608 both the inner coupling section 602 and the outer coupling section 604 open and rotate around the hinge 608.

After the couplers 600 are opened, the outer coupling section 604 is fastened around the section of conduit 202 by closing the coupler 600 around the section of conduit 202 and fastening the couplers 600. The adhesive material applied to the conduit helps to keep the couplers 600 in place. The couplers 600 are provided with a diameter that produced a tight seal when the couplers 600 are closed around the conduits 202.

Once the couplers 600 are in place a bridging duct 300 is then positioned around the inner coupling sections 602. The bridging duct 300 is opened along the slit and positioned so that the bridging duct 300 wraps around the inner coupling section 602 and as a result around the conduit 202 and the inner conduit 102.

The opposing walls 302 of the bridging duct 300 are brought together to secure the bridging duct 300 around the couplers 600. The opposing walls 302 are pressed together and a clip 400 is placed on the opposing walls 302 to form a seal.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such applications, modifications and embodiments within the scope of the present invention.

What is claimed is:

1. A utility conduit repair system, the conduit including two sections, the conduit repair system comprising:
   a bridging duct linking the two sections of the conduit; and
   a pair of couplers each having an inner coupling section and an outer coupling section, the pair of couplers each mating with the bridging duct and the two sections of the conduit, the outer coupling section of each of the couplers mating with one of the two sections of the conduit and the inner coupling section of each of the couplers mating with the bridging duct, each of said couplers further comprising a hinge and a slit allowing the coupler to be opened and closed along the slit.

2. A conduit repair system of claim 1, wherein said bridging duct has a slit along its length and opposing walls along the slit and includes a fastener pressing the opposing walls together.

3. A conduit repair system of claim 1, wherein the inner coupling section and the outer coupling section are each implemented as a truncated cone.

4. A conduit repair system of claim 2, wherein each of the opposing walls of the bridging duct comprises a slot and the fastener comprises at least one locking clip for engaging the slot.

5. A conduit repair system of claim 2 wherein said fastener comprises adhesive placed on the opposing walls of said bridging duct.

6. A conduit repair system, the conduit including two sections, the conduit repair system comprising:
   a bridging duct linking the two sections of the conduit; and
   a pair of couplers each having an inner coupling section and an outer coupling section, the pair of couplers each mating with the bridging duct and the two sections of the conduit, the outer coupling section of each of the couplers mating with one of the two sections of the conduit and the inner coupling section of each of the couplers mating with the bridging duct;
   wherein each of said couplers comprises a rib separating the inner coupling section and the outer coupling section, the rib including a hinge opposite a slit for allowing the coupler to be opened and closed along the slit.

7. A conduit repair system of claim 6, wherein said bridging duct has a slit along its length and opposing walls along the slit and includes a fastener pressing the opposing walls together.

8. A conduit repair system of claim 6, wherein the inner coupling section and the outer coupling section are each implemented as a truncated cone.

9. A conduit repair system of claim 7, wherein each of the opposing walls of the bridging duct comprises a slot and the fastener comprises at least one locking clip for engaging the slot.

10. A conduit repair system of claim 7 wherein said fastener comprises adhesive placed on the opposing walls of said bridging duct.

11. A method of repairing a utility conveyance conduit that houses at least one inner conduit, the utility conveyance conduit including two sections, the method comprising the steps of:
    placing two couplers around the at least one inner conduit,
    mating each of the two sections of the utility conveyance conduit with a corresponding one of the couplers, and
    mating each coupler with a bridging duct.

12. A method of repairing a conduit as set forth in claim 11, wherein the step of mating each coupler with a bridging duct further comprises the step of,
    placing the bridging duct around each coupler, and
    pressing opposing walls of the bridging duct together.

13. The method of claim 12 including the further step of fastening the opposing walls upon pressing them together.

* * * * *